United States Patent
Emerson

(10) Patent No.: US 10,871,018 B1
(45) Date of Patent: Dec. 22, 2020

(54) REVERSIBLE DOORS FOR AUOTMOBILES SUCH THAT THE DOOR CAN ELECTIVELY BE OPENED IN A TRADITIONAL ORIENTATION OR IN THE SUICIDE ORIENTATION

(71) Applicant: Anthony Emerson, Inc., Covina, CA (US)

(72) Inventor: Anthony Emerson, Covina, CA (US)

( * ) Notice: Subject to any disclaimer, the term of this patent is extended or adjusted under 35 U.S.C. 154(b) by 0 days.

(21) Appl. No.: 16/936,750

(22) Filed: Jul. 23, 2020

(51) Int. Cl.
    *E05D 15/50* (2006.01)
    *B60J 5/04* (2006.01)
    *B60R 16/027* (2006.01)

(52) U.S. Cl.
    CPC ............ *E05D 15/50* (2013.01); *B60J 5/0476* (2013.01); *B60R 16/027* (2013.01)

(58) Field of Classification Search
    None
    See application file for complete search history.

(56) References Cited

U.S. PATENT DOCUMENTS

| | | | | |
|---|---|---|---|---|
| 5,158,043 | A * | 10/1992 | Emsbo | F23M 7/00 110/173 R |
| 7,000,976 | B2 * | 2/2006 | Azzouz | B60J 5/0479 296/146.1 |
| 7,488,029 | B2 * | 2/2009 | Lechkun | B60J 5/0479 296/146.1 |
| 7,591,504 | B1 * | 9/2009 | Schrader | B60J 5/0476 296/146.12 |
| 2003/0020379 | A1 * | 1/2003 | Larsen | E05D 15/502 312/218 |
| 2007/0256447 | A1 * | 11/2007 | Leimkuehler | E05D 15/505 62/440 |
| 2007/0294860 | A1 * | 12/2007 | Hoffman | E05D 3/186 16/368 |
| 2008/0216288 | A1 * | 9/2008 | Hoffman | E05D 3/127 16/354 |
| 2009/0106940 | A1 * | 4/2009 | Greenbank | E05D 3/127 16/367 |
| 2010/0269301 | A1 * | 10/2010 | Yip | E05D 3/10 16/374 |
| 2011/0259185 | A1 * | 10/2011 | Berning | F41H 7/04 89/36.02 |
| 2017/0057357 | A1 * | 3/2017 | Borghi | B60R 25/01 |
| 2019/0160922 | A1 * | 5/2019 | Hagedorn | E05D 3/04 |
| 2020/0018012 | A1 * | 1/2020 | Renz | E05B 59/00 |

* cited by examiner

*Primary Examiner* — Lori L Lyjak
(74) *Attorney, Agent, or Firm* — Sandy Lipkin

(57) ABSTRACT

A car door that is affixed to an automobile that can be opened from one or more hinges that attach and allows opening and closing of the door toward the front end of the car that can also be electively chosen through a computerized module inside the automobile to open from one or more hinges that attach and allows opening and closing of the door toward the rear end of the car, i.e., in the suicide orientation. A door latch assembly is attached to either side that allows for a pin to close the side not in use when activated and when de-activate allows for the opening in the chosen orientation. The computer module is programmed such that only one side can be open at a time. Manual override from inside the vehicle is provided in the event of an electrical system failure.

4 Claims, 8 Drawing Sheets

REVERSIBLE DOORS FOR AUOTMOBILES SUCH THAT THE DOOR CAN ELECTIVELY BE OPENED IN A TRADITIONAL ORIENTATION OR IN THE SUICIDE ORIENTATION

BACKGROUND OF THE INVENTION

Field of the Invention

The field of this invention relates generally to the field of doors for automobiles and more particularly toward a car door that is reversible in that it can open in the traditional orientation or it can be converted to open in the orientation known as the suicide orientation.

Description of the Prior Art

Automobiles are ubiquitous in our culture. Traditional doors for entry and exist into automobiles hinge from the front of the cavity into which the door sets when it is closed. This allows for the door to open against the flow of air as it aerodynamically flows against the automobile when it is in motion such that the force of wind would close the door back into its cavity.

By contrast, what are known as "suicide" doors are hinged from the rear of the cavity into which the door sets when it is closed. As such when the door opens this way, the force of wind in a moving vehicle causes the door to remain open or to open even further. Before the advent of seatbelts, these doors were dangerous in that it was easy for a passenger to fall out of a car in motion if the door were opened, either accidentally or intentionally. Hence, it was given the slang name of a "suicide door" due to this safety factor.

Given that seatbelts are now ubiquitous and drivers and passengers in automobiles habitually buckle themselves in, the safety concerns with suicide doors are less of a concern than in the past. As a result, suicide doors are being implemented into some luxury automobiles as a novel design feature. However, heretofore, the door in any automobile could only be engineered as either a traditional door or a suicide door.

It is the object of the instant invention to provide a door for an automobile that is movable between both orientations at the discretion of the passenger in the car.

SUMMARY OF THE INVENTION

The basic embodiment of the present invention teaches a car door system for an automobile comprising: an automobile with a cavity on the side for entry and exit therefrom; a car door that seats into said cavity, said car door having a first end proximate the front end of said automobile and a second end proximate the rear end of said automobile; one or more hinges connected to said car door that attaches said car door to said first end proximate the front end of said automobile; one or more hinges connected to said car door that attaches said car door to said second end proximate the rear end of said automobile; a first door latch proximate said one or more hinges connected to said car door that attaches said car door to said first end proximate the front end of said automobile; a second door latch proximate said one or more hinges connected to said car door that attaches said car door to said second end proximate the rear end of said automobile; and a computer module connected to each of said first and second door latches wherein said computer module communicates with each of said first and second door latches.

The above embodiment can be further modified by defining that said computer module allows a user to choose between one or the other of said first and second door latches thereby choosing either a front opening orientation or a rear opening orientation.

The above embodiment can be further modified by defining that said computer module is programmed to disallow the simultaneously activation of both of said first and second door latches.

The above embodiment can be further modified by defining that said computer module is disabled in the event of an electrical system failure thereby allowing for the manual selection of a car door opening orientation.

BRIEF DESCRIPTION OF THE DRAWINGS

For a better understanding of the present invention, reference is to be made to the accompanying drawings. It is to be understood that the present invention is not limited to the precise arrangement shown in the drawings.

DETAILED DESCRIPTION OF A PREFERRED EMBODIMENT

Figure 1:
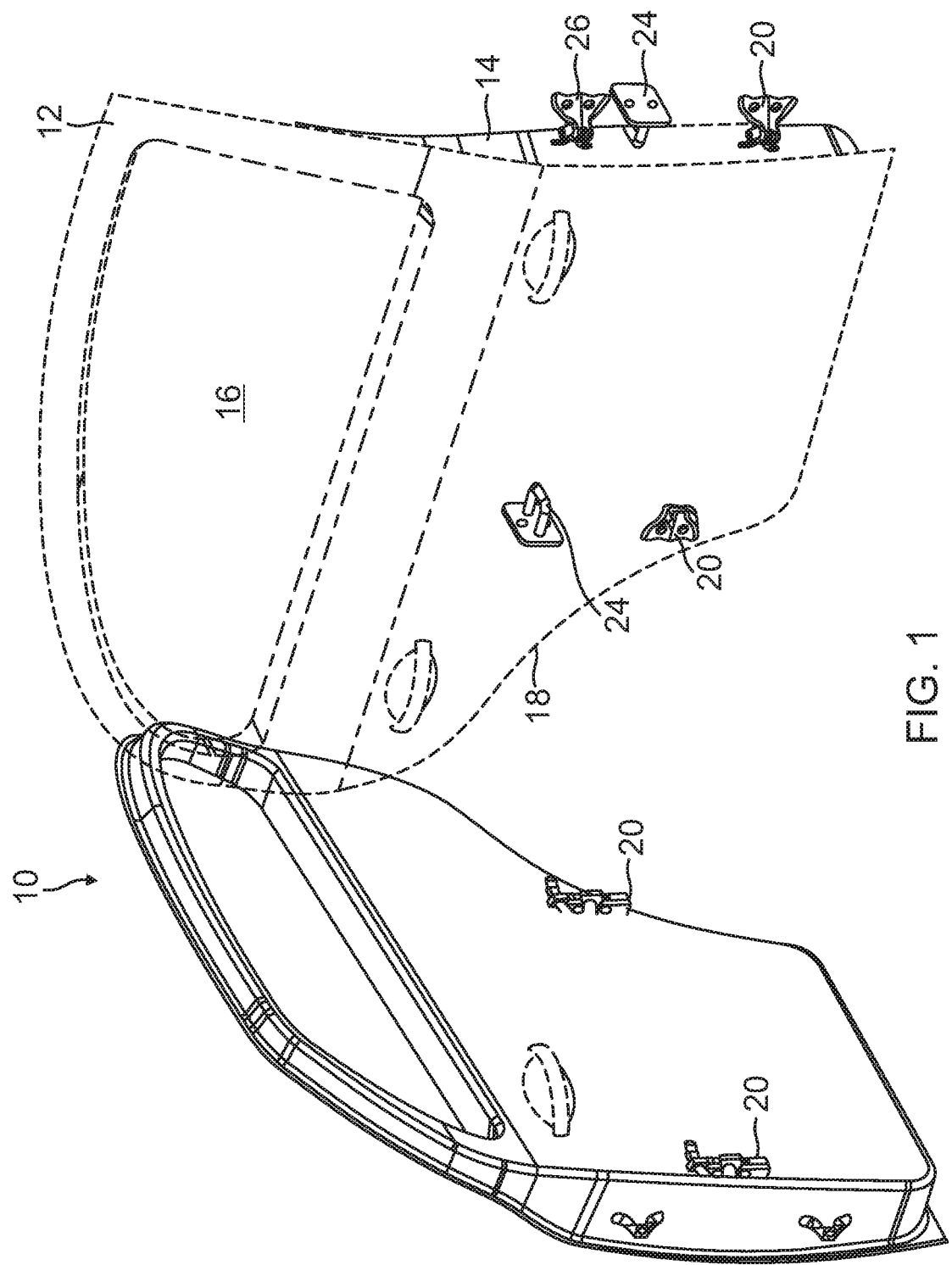
FIG. 1 is a front perspective view of the car door of the instant invention open in the suicide orientation.
Figure 2:
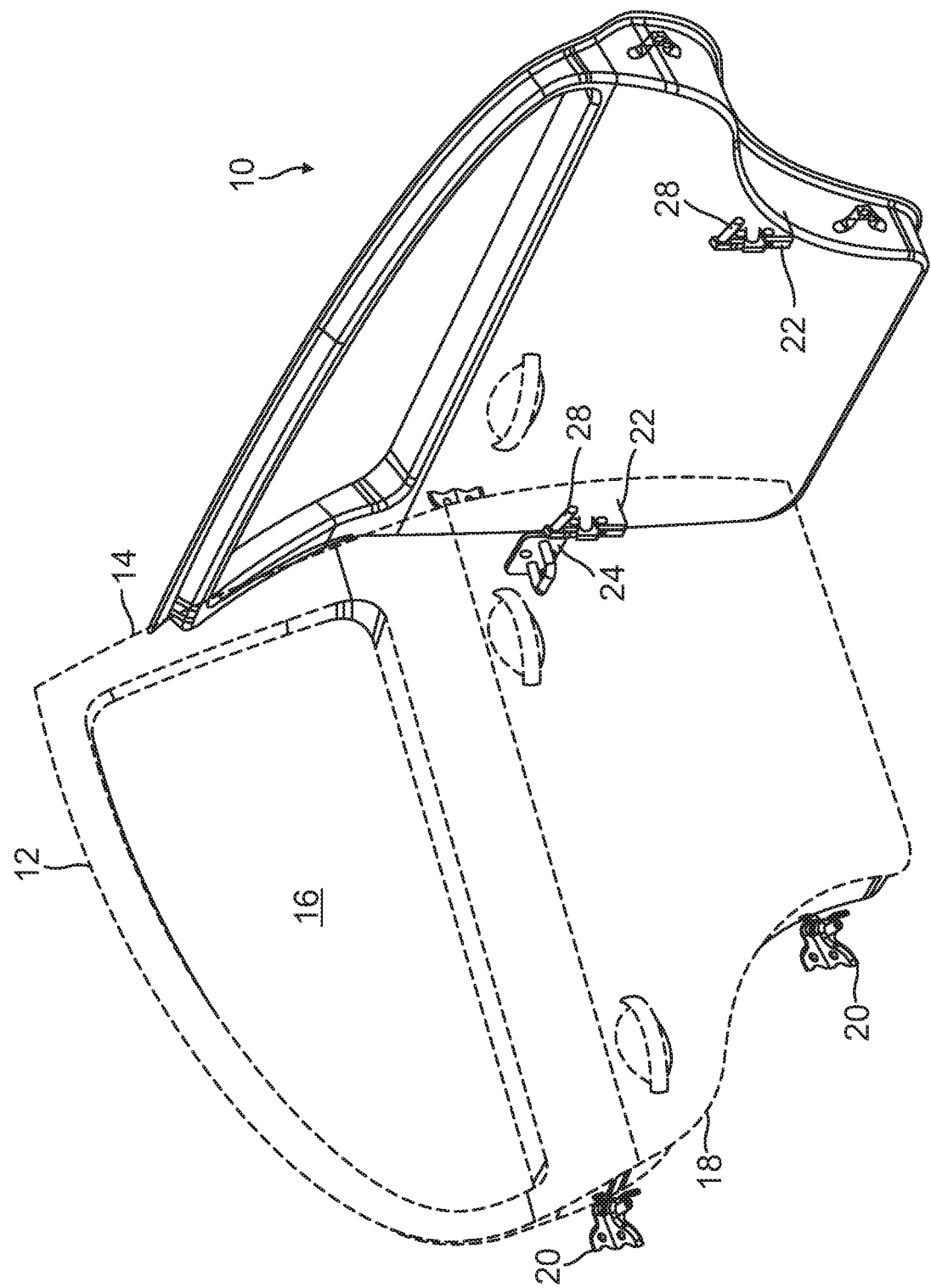
FIG. 2 is a rear perspective view of the car door of the instant invention open in the traditional orientation.
Figure 3:
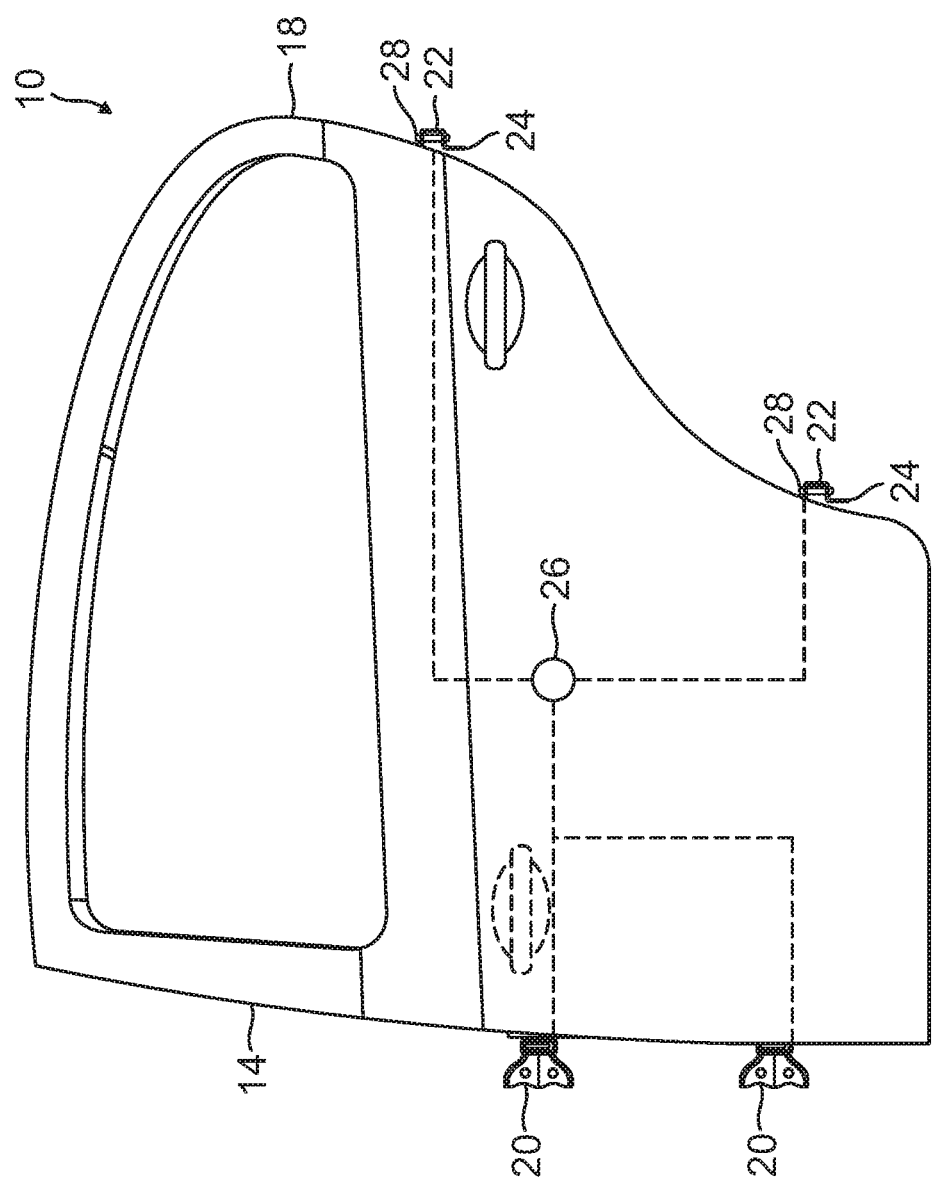
FIG. 3 is a side view of the car door of the instant invention in the closed position shown from the outside of the car.
Figure 4:
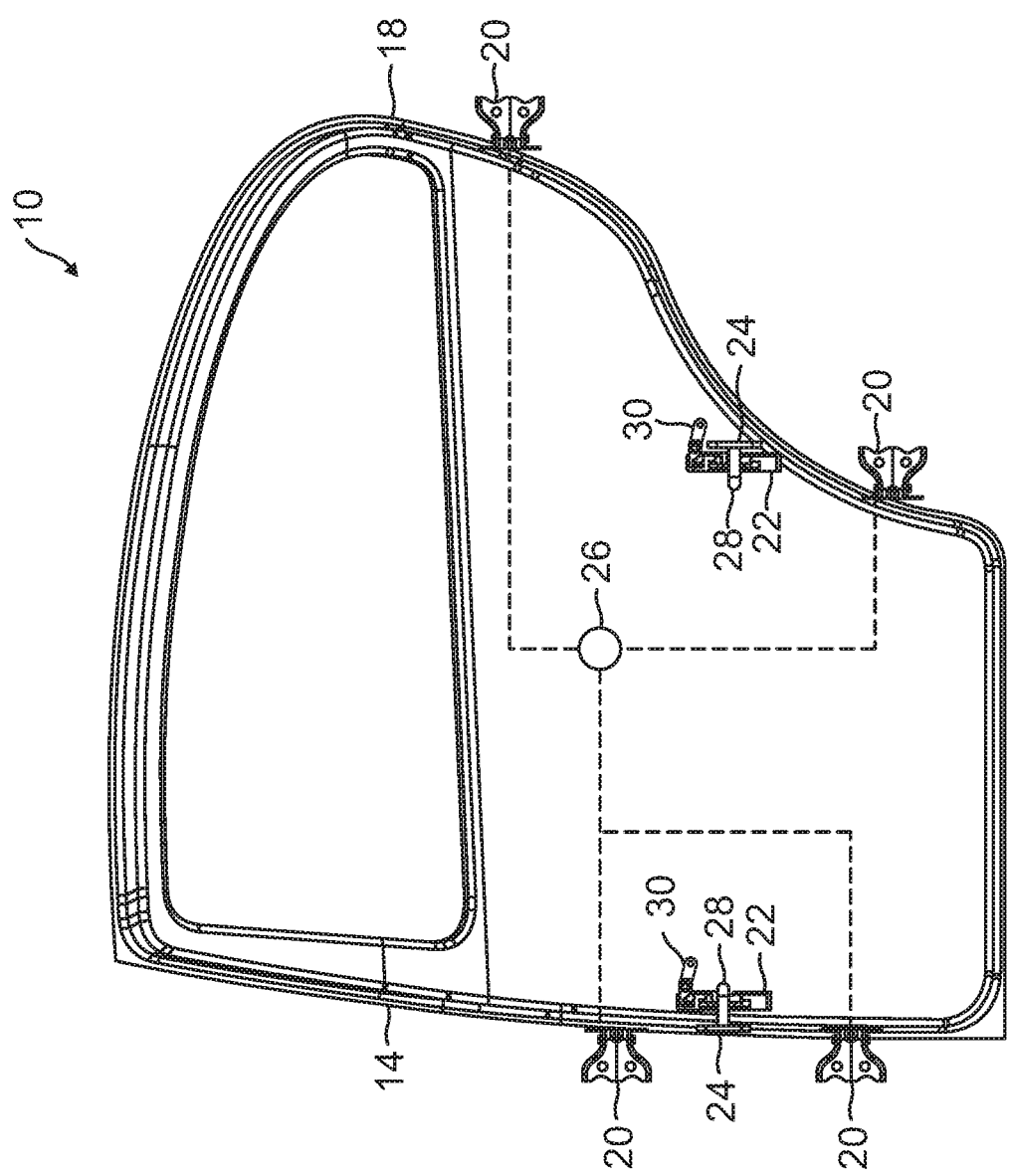
FIG. 4 is a side view of the car door of the instant invention in the closed position shown from the inside of the car.

Turning to the drawings, the preferred embodiment is illustrated and described by reference characters that denote similar elements throughout the several views of the instant invention.

The preferred embodiment of the instant invention provides for a customized car door 10 for an automobile that can be selected by the passenger in the car proximate the door 10 to either open in the traditional way, i.e., from the front end 14 of the cavity 16 into which the door 10 is secured when in the closed position or to open from the back end 18 of the cavity 16 into which the door 10 is secured when in the closed position. One or more hinges 20 connect the door 10 on either the front end 14 or the back end 18 of the cavity 16. For the traditional style, there are two hinges 20. For the suicide style, there is only one hinge 20.

A door latch is affixed to the hinge area of both ends 14, 18 of the cavity 16 into which the door 10 is secured to the car body. The door latch assembly 22 includes a lever 30 that selects which style is activated or de-activated, the door latch assembly 22 being attached to the door 10 and hooking onto a striker plate 24 with a pin 28. The striker plate 24 is attached to the car door frame where the door 10 sets into the cavity 16.

A computer module 26 controls the interior lever mechanism that simultaneously locks the hinge or hinges 20 on one end 14, 18 of the door 10 for one style and opens the hinge or hinges 20 on the other end 14, 18 of the door 10 for the alternate style. A computer module regulates the locking function of the lever mechanism, but defaults to the traditional style in the case of a system correction. Additionally, the module overrides to manual door control in the case of an electronic system failure.

Figure 5:
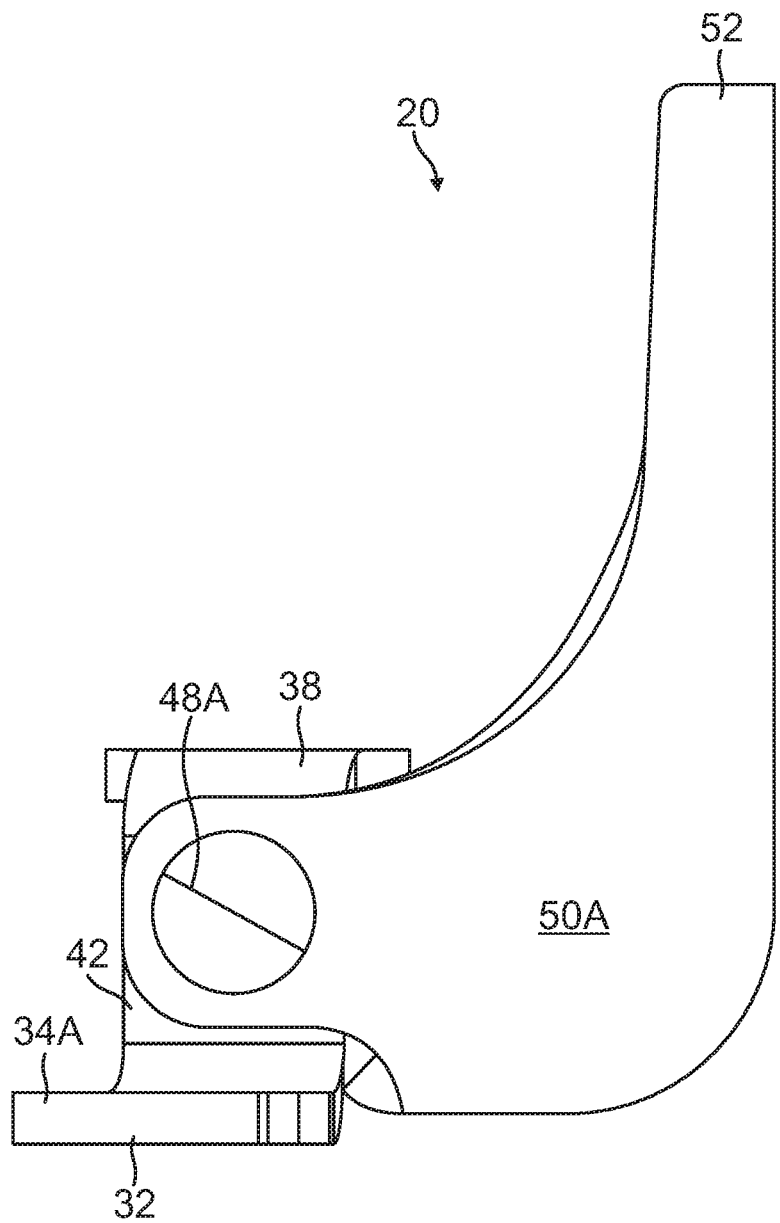
FIG. 5 is a side view of the door hinge for the car door of the instant invention.
Figure 6:
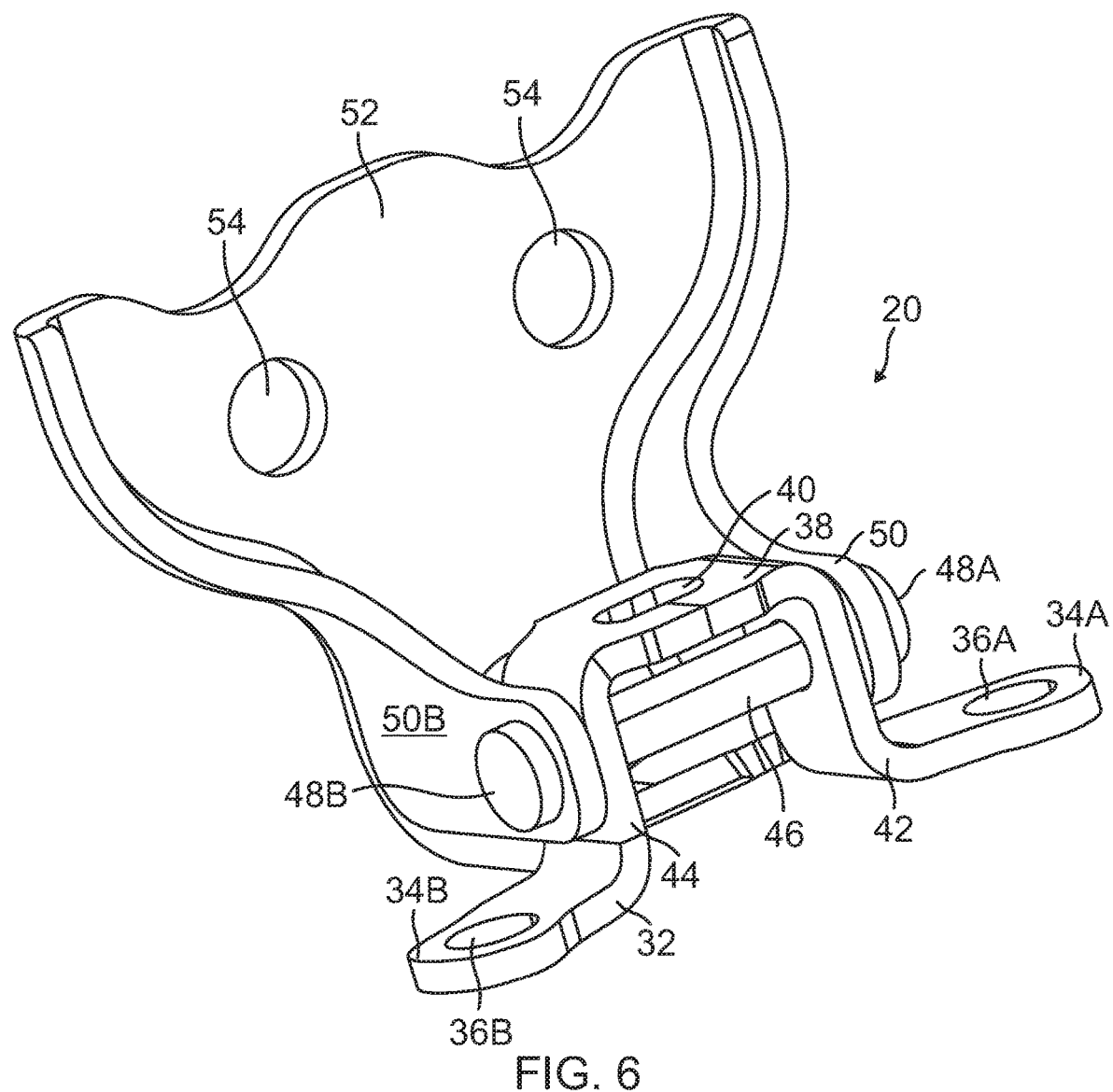
FIG. 6 is a front side perspective view of the door hinge for the car door of the instant invention.
Figure 7:
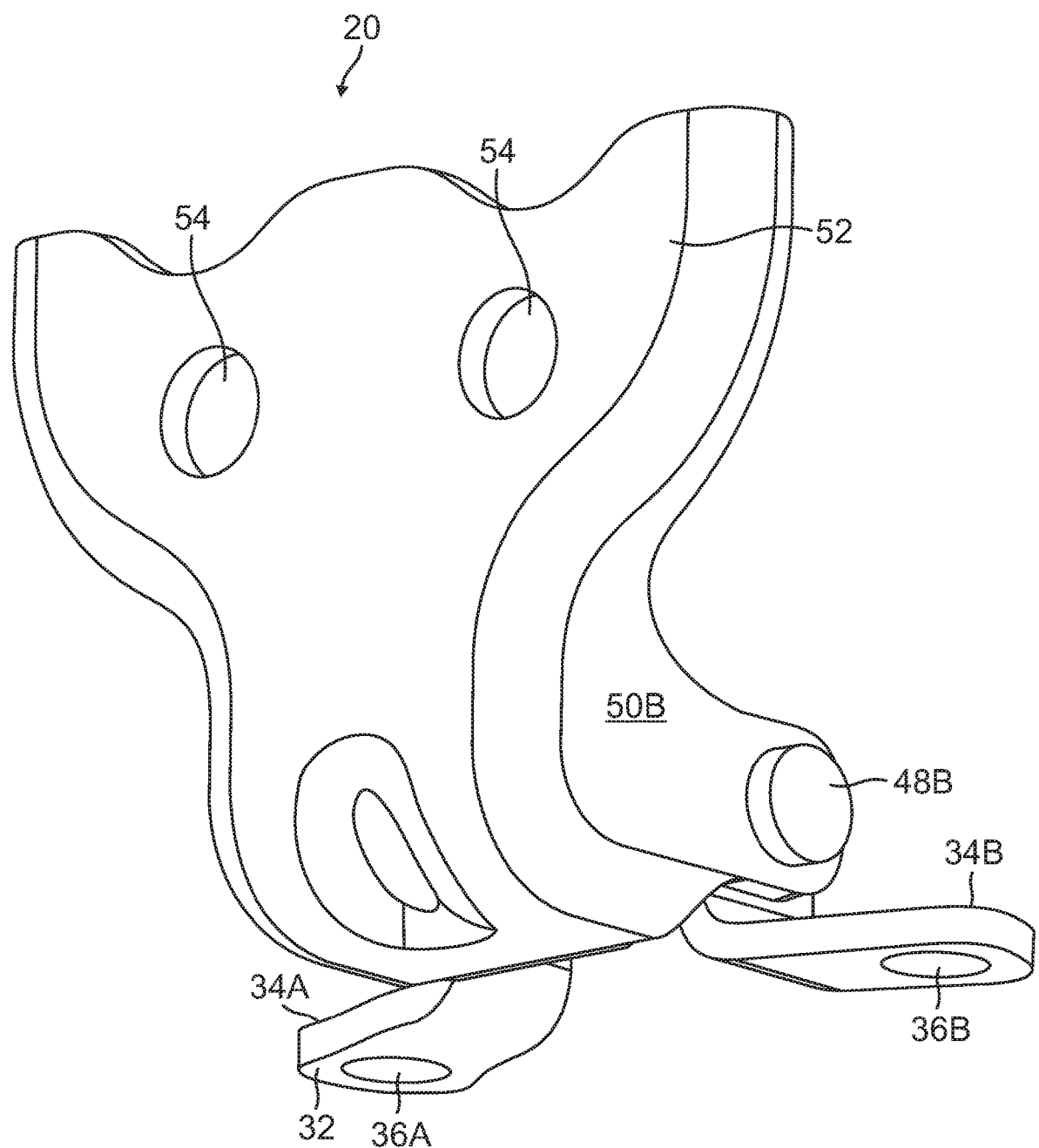
FIG. 7 is a back side perspective view of the door hinge for the car door of the instant invention.

The hinge 20 is shown in various views in FIGS. 5-7. The hinge 20 includes a base 32 with two opposing sides 34A, 34B each with an aperture 36A, 36B therethrough for securing of the hinge 20 to the door 10. Between the two opposing planar sides 34A, 34B is a connecting piece that includes two sides 42, 44 that correspond to the opposing planar sides 34A, 34B and that extends upwardly from one side 34A up to a plateau 38 with an aperture 40 therethrough before it extends downwardly again to connect to the other side 34B. The upwardly and downwardly extending portions connecting the plateau 38 have apertures therethrough with a connecting piece 46 that can rotate in a circular direction therein. At either end of the connecting piece 46 are abutting portions 48A, 48B that extend through the ends 50A, 50B of the opposing side 52 of the side 50 of the hinge 20, said opposing side having one or more apertures 54 therethrough to attach the hinge 20 to the body of the automobile 12.

Figure 8:
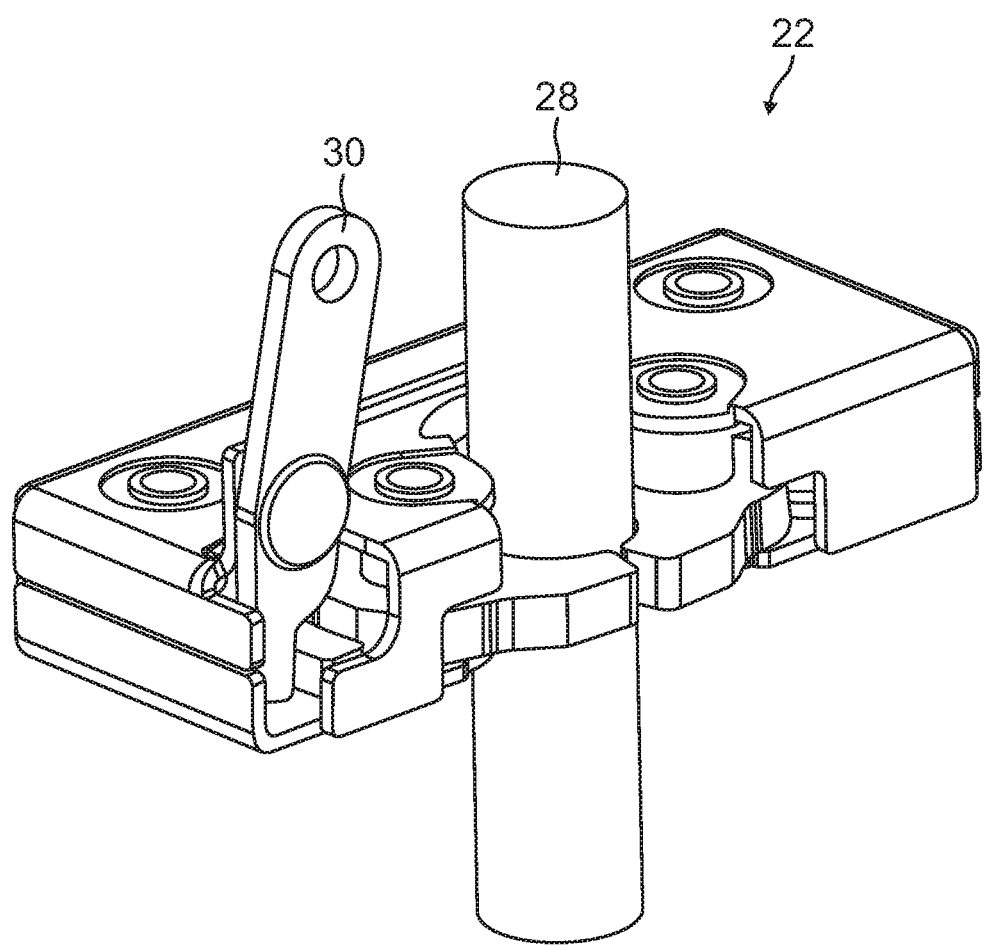
FIG. 8 is a perspective view of the door latch for the car door of the instant invention.

The door latch assembly 22 is seen in FIG. 8. The assembly 12 includes a support member 30 and the pin 28 for the striker plate.

The invention illustratively disclosed herein suitably may be practiced in the absence of any element which is not specifically disclosed herein.

The discussion included in this patent is intended to serve as a basic description. The reader should be aware that the specific discussion may not explicitly describe all embodiments possible and alternatives are implicit. Also, this discussion may not fully explain the generic nature of the invention and may not explicitly show how each feature or element can actually be representative or equivalent elements. Again, these are implicitly included in this disclosure. Where the invention is described in device-oriented terminology, each element of the device implicitly performs a function. It should also be understood that a variety of changes may be made without departing from the essence of the invention. Such changes are also implicitly included in the description. These changes still fall within the scope of this invention.

Further, each of the various elements of the invention and claims may also be achieved in a variety of manners. This disclosure should be understood to encompass each such variation, be it a variation of any apparatus embodiment, a method embodiment, or even merely a variation of any element of these. Particularly, it should be understood that as the disclosure relates to elements of the invention, the words for each element may be expressed by equivalent apparatus terms even if only the function or result is the same. Such equivalent, broader, or even more generic terms should be considered to be encompassed in the description of each element or action. Such terms can be substituted where desired to make explicit the implicitly broad coverage to which this invention is entitled. It should be understood that all actions may be expressed as a means for taking that action or as an element which causes that action. Similarly, each physical element disclosed should be understood to encompass a disclosure of the action which that physical element facilitates. Such changes and alternative terms are to be understood to be explicitly included in the description.

What is claimed is:

1. A car door system for an automobile comprising:
    an automobile with a cavity on the side for entry and exit therefrom;
    a car door that seats into said cavity, said car door having a first end proximate the front end of said automobile and a second end proximate the rear end of said automobile;
    one or more hinges connected to said car door that attaches said car door to said first end proximate the front end of said automobile;
    one or more hinges connected to said car door that attaches said car door to said second end proximate the rear end of said automobile;
    a first door latch proximate said one or more hinges connected to said car door that attaches said car door to said first end proximate the front end of said automobile;
    a second door latch proximate said one or more hinges connected to said car door that attaches said car door to said second end proximate the rear end of said automobile; and
    a computer module connected to each of said first and second door latches wherein said computer module communicates with each of said first and second door latches.

2. The car door system for an automobile as defined in claim 1 wherein said computer module allows a user to choose between one or the other of said first and second door latches thereby choosing either a front opening orientation or a rear opening orientation.

3. The car door system for an automobile as defined in claim 1 wherein said computer module is programmed to disallow the simultaneously activation of both of said first and second door latches.

4. The car door system for an automobile as defined in claim 1 wherein said computer module is disabled in the event of an electrical system failure thereby allowing for the manual selection of a car door opening orientation.

\* \* \* \* \*